United States Patent [19]

Marsella et al.

[11] Patent Number: 4,704,180

[45] Date of Patent: Nov. 3, 1987

[54] METHOD AND APPARATUS FOR SUPPLYING TO A CONTAINER FORMING MACHINE A WEB HAVING A STERILE FACE

[75] Inventors: Louis J. Marsella, Fremont, Calif.; Gautam K. Mahajan, Stamford, Conn.

[73] Assignee: Continental Packaging Company, Stamford, Conn.

[21] Appl. No.: 420,756

[22] Filed: Sep. 21, 1982

[51] Int. Cl.$^4$ ............................................. B32B 31/08
[52] U.S. Cl. .................................... 156/324; 156/381; 156/502
[58] Field of Search ................ 53/425, 426, 453, 484, 53/559; 156/157, 324, 381, 502; 428/192

[56] References Cited

U.S. PATENT DOCUMENTS 3,967,994 7/1976 Langberg ........................ 156/157 X
4,160,852 7/1979 Torterotot et al. ................. 428/192
4,165,594 8/1979 Corbic .................................. 53/453

Primary Examiner—Robert A. Dawson
Attorney, Agent, or Firm—Charles E. Brown

[57] ABSTRACT

This relates to the forming of packages by thermoforming a web which is of a laminated construction. By forming the web as two separate webs, particularly when one of the webs may include sterile components, the number of splices which must be made under sterile conditions is greatly reduced as compared to the number of splices which may be conventionally formed.

3 Claims, 5 Drawing Figures

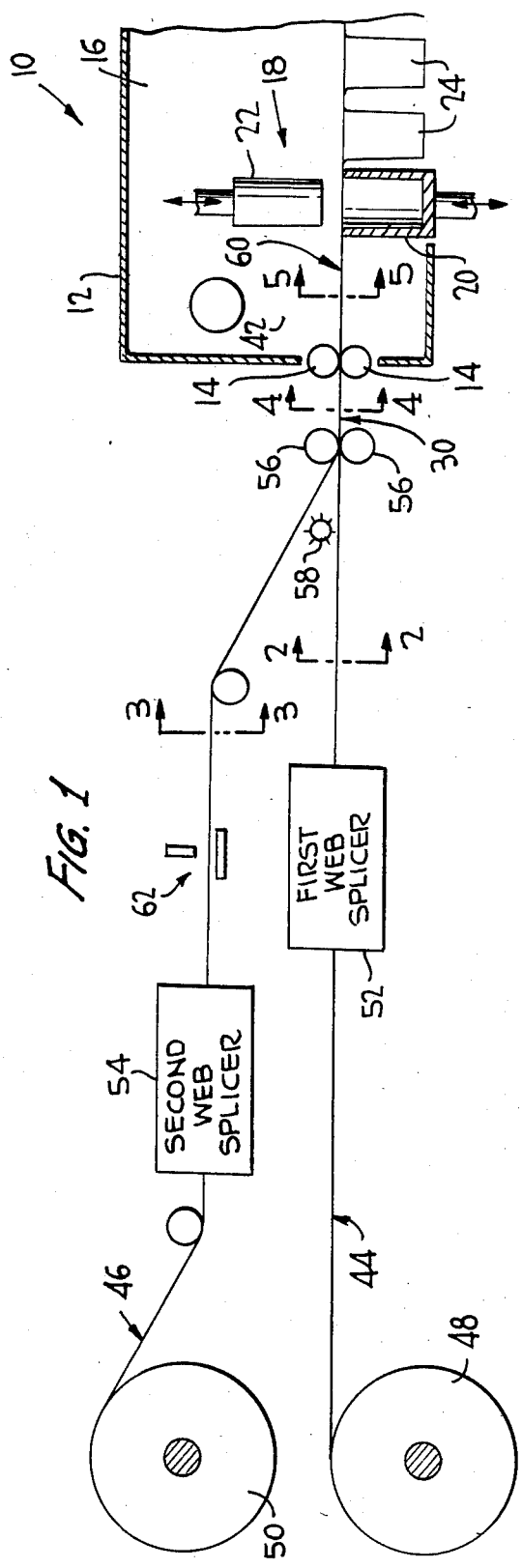
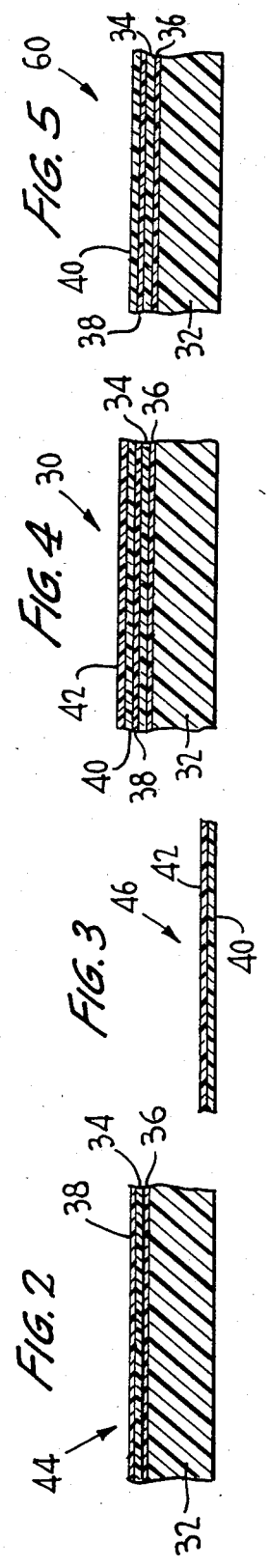

METHOD AND APPARATUS FOR SUPPLYING TO A CONTAINER FORMING MACHINE A WEB HAVING A STERILE FACE

This invention relates in general to the forming of containers, filling the containers, and then closing the containers. Most particularly, the invention relates to the supplying of a laminated web which has a sterile inner face which becomes the exposed face of a thermoformed container which is then filled under sterile conditions and closed.

The invention generally relates to machines of the type disclosed in the patent to Corbic, U.S. Pat. No. 4,165,594, granted Aug. 28, 1979, and particularly relates to the supplying of a web of the type disclosed in the patent to Torterotot et al, U.S. Pat. No. 4,160,852, granted July 10, 1979.

In accordance with the two aforementioned patents, there is provided a web which is of a coextruded structure but could also be a laminated construction with all layers thereof being thermoformed and wherein the outermost or facing layer is formed of either a heat bondable thermoplastic or a plastic that can be bonded to by adhesives, heat seal coatings or the like. The exposed face of this outer layer is sterile when presented to the package forming machine and is not uncovered until it is within the sterile atmosphere of the forming machine.

The customary laminate from which containers are thermoformed in accordance with the foregoing patents includes a thick base layer to which there is bonded by an adhesive layer the barrier layer which, in turn, has bonded thereto by an adhesive layer the facing layer. The facing layer has a coextruded or heat laminated cover layer. The coextrusion process kills all the germs between the facing layer and the cover layer. The heat lamination process must be designed to do the same.

In view of the fact that the facing layer has that face thereof which becomes exposed in a sterile state and this sterility must be maintained at all times, it will be seen that if the laminated web is supplied as a single web, as is now customary, then each time the web must be spliced, the facing layer and the protective covering must be spliced under conditions wherein the sterility of the opposed faces thereof is maintained. This has posed both a web production problem and an operating problem.

It has been found that in forming the base laminate which includes the relatively thick base layer and the barrier layer and in the prior art the cover layer, frequent splices occur because of the necessity to rework the material during the extrusion or coextrusion process to eliminate regions of poor quality. Thus, a roll of the laminated web supplied for use may have a number of splices therein. To obtain a usable roll, splices are not allowable. This implies that either special care is required in manufacturing, or that there will be high spoilage, or that one will supply short rolls to customers should a problem occur in the roll during manufacture.

It is further necessary to form splices between ends of the rolls as a roll is depleted. Inasmuch as the base layer in particular is relatively thick, the amount of laminated web which can be supplied on a readily handleable roll is limited. Accordingly, frequent stopping of the package forming machine is necessary, and each time a splice must be made such that the sterility of the facing layer and the protective covering is not lost. This is not only difficult to do, but it is also difficult to prove that sterility is not lost.

In accordance with this invention, it is proposed separately to form the facing layer and the protective covering and in a like manner separately to form the base layer and the barrier layer as well as the associated adhesive layers and a layer compatible for bonding with the facing layer. This last layer is not necessary if the adhesive layer is desired as the bonding layer to the facing layer. By doing so, the necessary splices during manufacture may be made in the base layer without encountering the problem of maintaining sterility. Further, since rolls of comparable size of the base and barrier layers will contain much less footage than rolls of the face layer and protective covering, the sterile splices which must be made at the package forming machine are greatly reduced.

Further, by supplying the facing layer and covering layer separately, not only may the more dependable extrusion-blow film method be utilized, but also the facing layer and the covering layer may be inspected for pinholes.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic side elevational view of a packaging machine provided with separate webs in accordance with this invention.

FIGS. 2-5 are fragmentary enlarged sectional views taken through the various webs on the respective section lines 2—2 through 5—5.

Referring to the drawings in detail, in FIG. 1 there is schematically illustrated a packaging machine 10 which, in and of itself, forms no part of this invention and which may be generally of the type disclosed in the aforementioned Corbic U.S. Pat. No. 4,165,594. The packaging machine 10 includes, among other features, a casing 12 having an inlet opening defined by the nip of the two opposed entrance rolls 14. The rolls are generally on the outside of the sterile chamber. The casing 12 defines a sterile atmosphere 16 and within the sterile atmosphere 16 there is a thermoforming mechanism generally identified by the numeral 18. The thermoforming mechanism 18 includes a multiple cavity mold 20 and a multiple plunger head 22 which reciprocate relative to one another as indicated so as to form, on a continuous basis, containers 24. It is to be understood that the web from which the containers 24 are formed must be heated, and during the forming of the containers, labels may be applied thereto. These, however, are features of the packaging machine 10 which in no way form a part of this invention. In a like manner, the containers 24 may be filled with a product under sterile conditions within the sterile atmosphere 16 and closed by means of a suitable cover layer which may be heat bonded to the containers 24.

Normally the machine 10 would have supplied thereto a laminated web such as that shown in FIG. 4. The laminated web is generally identified by the numeral 30 and includes a relatively thick base layer 32 to which there is bonded a barrier layer 34 by means of an intermediate adhesive layer 36. The barrier layer 34 has adhesively bonded thereto by means of an adhesive layer 38 a facing layer 40. The facing layer 40, in turn, has coextruded or heat laminated thereto a protective covering 42 with the opposed faces of the facing layer 40 and the protective covering 42 being sterile, due to the coextrusion process or the heat lamination.

As discussed above, in the manufacture of the web 30, because of production deficiencies, it is necessary to make many splices, particularly in the base layer 32. Since the various layers of the laminated web 30 are customarily formed by a coextrusion process, as disclosed in the Torterotot et al U.S. Pat. No. 4,160,852, each time there is a poor quality region in any of the layers it is necessary to cut away the poor quality material and to splice together the good material. This requires not only a satisfactory splice from which the thermoformed containers 24 may be formed, but also the sterility of the opposed faces of the facing layer 40 and the protective covering 42 must be maintained.

In accordance with this inveniton, it is proposed separately to form parts of the laminated web 30 and to supply to the package forming machine 10 two separate webs. These webs include a first web 44 and a second web 46. Each of the webs 44 and 46 is supplied in the form of a roll of web material with the rolls being of substantially the same diameter. The roll for the first web 44 is identified by the numeral 48, and the roll of the second web 46 is identified by the numeral 50.

Referring now to FIG. 2, it will be seen that the first web 44 is formed of the base layer 32, the adhesive layer 36, the barrier layer 38 and the adhesive layer 40. These four layers may be coextruded in the manner disclosed in the aforementioned Torterotot et al patent. Generally a fifth layer may be added of the same material as the facing material. This will facilitate heat bonding of the two laminates.

Referring now to FIG. 3, it will be seen that the second web 46 consists of the facing layer 40 and the protective covering 42. The web 46 may be formed by several methods including coextrusion, casting of the protective covering 42 onto the facing layer 40, or, inasmuch as the facing layer 40 and the protective covering 42 are relatively thin, the materials may be coextruded as a tube which is blown in the customary manner to form a laminated film. This latter method is preferred in that for all practical purposes such a laminated film may be formed free of defects and thus the necessity for splices in the manufacture thereof is minimal, or, for all practical purposes, non-existent.

It is also to be understood that inasmuch as the first web 44 is much thicker than the second web 46, with the rolls 48 and 50 being of the same size, there is a much greater footage of the second web 46 on the roll 50 than that of the first web 44 on the roll 48, and thus the second web roll need be replaced and the two second webs spliced together in end-to-end relation much less frequently than the required splicing together of the webs 44 from different rolls.

Referring once again to FIG. 1, it will be seen that a first web splicer 52 is provided for splicing the ends of the first webs 44, and that a second web splicer 54 is provided for splicing together ends of the webs 46. It is to be understood that the first web splicer 52 may be of an automatic type and that sterility of the various layers of the web 44 need not be maintained. On the other hand, the splicing of the ends of the second webs 46 must be effected under sterile conditions, and therefore the second web splicer must include a sterile atmosphere. Since the provision of this sterile atmosphere may be customarily effected by merely supplying sterile air under pressure into the interior of a casing wherein the splicing is effected, no attempt has been made here to describe the means for providing the sterile atmosphere.

Referring once again to FIG. 1, it will be seen that the webs 44 and 46 travel along separate paths and converge in a nip defined by a pair of rolls 56. prior to the webs 44 and 46 coming into contact with one another, one or both of the webs 44, 46 will be heated by means of an infrared heater, a contact heater or other type of conventional heating means. In lieu of the heater 58 there could be an adhesive gun or the like. The heated surfaces of the facing layer 40 and the adhesive layer 38 or compatible bonding layer, when applied together under pressure within the nip defined by the rollers 56, will satisfactorily bond the facing layer 40 to the web 44 such that this new laminate may be thermoformed within the package forming machine 10 without separation of the facing layer 40 from the remainder of the web.

The joined-together webs 44, 46 now become the previously described web 30 of FIG. 4 and pass through the sterile chamber 16 through the nip defined by the rolls 14. Once the web 30 is within the sterile chamber 16, the protective covering 42 may be removed from the web 30 and the protective covering may be salvaged either within the casing 12, as shown, or externally thereof.

The removal of the protective covering 42 leaves for forming a laminated web 60 having a sterile upper surface defined by the now exposed upper surface of the facing layer 40. Thus, when the web 60 is formed into containers 24, the product receiving surfaces of such webs are sterile and the product may be packaged under sterile conditions.

Since the facing layer 40 and the protective covering 42 are supplied as a separate web as opposed to being simultaneously formed with the other layers of the resultant laminate or web 30, the facing layer 40 may be subjected to inspection for pinholes using a conventional inspecting device 62. The inspecting device 62 may either be incorporated in the web feed means for the machine or may be provided in the web forming line so as to inspect the web 46 as it is reeled from the roll 50.

Although the webs 44 and 46 may vary as to number of layers and the materials from which the layers are formed, in a preferred embodiment of the invention the base layer 32 is preferably formed of polystyrene and will have a thickness on the order of 15–60 mils. Each of the adhesive layers 36, 38 may be formed of a conventional adhesive and have a thickness on the order of $\frac{1}{2}$ mil–1 mil. The barrier layer 34 is preferably formed of SARAN and will have a thickness on the order of 2–4 mils. Thus, the first web 44 will have a total thickness on the order of 19–66 mils.

The web 46 will be formed of a polyethylene facing layer 40 and a protective covering may be suitably formed of polypropylene. By coextruding these two layers and due to the inherently peelable bond between the polyethylene and the polypropylene, the opposed faces of the layers are sterile when formed and maintain their sterility.

The polyethylene facing layer has a thickness on the order of 2–6 mils, whereas the polypropylene protective covering has a thickness on the order of 2 mils. Thus, the total thickness of the web 46 is on the order of 4–8 mils.

In view of the difference between the thickness of the webs 44 and 46, it will be seen that on the order of 5-8 times the footage may be on the roll 50 of the web 46 than on the roll 48 of the web 44, and thus the splices in the web 46 which may be effected in a sterile atmosphere are greatly reduced as compared to the number of splices required for the web 44.

In other structures, the pllystyrene can be replaced by other polymers such as polyester, vinyl, polypropylene, etc. Likewise, the structure of the base laminate can vary significantly from that described. For example, it could be a monolayer, with affinity for the facing layer, or the exposed face of the facing layer.

In the same manner the facing layer and the covering layer can be of a variety of polymers that can peel from each other. Also, the facing/covering layer system could be a three component system to render the exposed surface of the facing layer bondable to the base structure.

Although only a preferred embodiment of the invention has been specifically illustrated and described herein, it is to be understood that the principles of this invention may be employed in other environments including those which do not require sterility in the various layers.

We claim:

1. A method of forming a packaging film or sheet of the type including relatively thick base laminates, a relatively thin facing layer, and a relatively thin separable protective layer, said method comprising separately producing said base laminates on the one hand and said facing layer and said protective layer on the other hand, supplying said base laminate as a first web in the form of a first roll of a preselected size, supplying said joined together facing and protective layers as a second web in the form of a second roll of generally the same preselected size but in a much greater length due to the difference in thickness, simultaneously supplying said webs to a web forming machine while joining together said webs in laminated relation, and opposed faces of siad facing layer and said protective layer being sterile.

2. A method of forming a packaging film or sheet of the type including relatively thick base laminates, a relatively thin facing layer, and a relatively thin separable protective layer, said method comprising separately producing said base laminates on the one hand and said facing layer and said protective layer on the other hand, supplying said base laminate as a first web in the form of a first roll of a preselected size, supplying said joined together facing and protective layers as a second web in the form of a second roll of generally the same preselected size but in a much greater length due to the difference in thickness, simultaneously supplying said webs to a web forming machine while joining together said webs in laminated relation, said forming machine including a chamber defining a sterile atmosphere, opposed faces of said facing layer and said protective layer being sterile, and siad protective layer being removed from said laminated webs within said sterile atmosphere.

3. An apparatus for forming sterile laminated wall containers, said apparatus comprising a machine for thermoforming a laminated web to define containers, said machine having a sterile chamber in which said thermoforming is carried out, means for supplying a first web and a separate second web, means for bonding together said first and second webs in overlying laminated relation in advance of said sterile chamber, means for directing said laminated webs into said sterile chamber as a unit, a first splicing means for splicing together plural first webs in end-to-end relation, and separate second splicing means for separately splicing together plural second webs in end-to-end relation, said first and second splicing means being located in advance of said means for bonding said webs together in overlying laminated relation, said second web including separable webs having opposed sterile faces, and said second splicing means having a sterile atmosphere wherein second webs may be spliced together while maintaining the sterility of said sterile faces.

* * * * *